United States Patent
Liu et al.

(10) Patent No.: US 11,050,555 B2
(45) Date of Patent: Jun. 29, 2021

(54) METHOD FOR REMOTELY ACQUIRING SECRET KEY, POS TERMINAL AND STORAGE MEDIUM

(71) Applicant: PAX COMPUTER TECHNOLOGY (SHENZHEN) CO., LTD, Guangdong (CN)

(72) Inventors: Chuan Liu, Guangdong (CN); Yongquan Yang, Guangdong (CN)

(73) Assignee: PAX COMPUTER TECHNOLOGY (SHENZHEN) CO., LTD., Guangdong (CN)

( * ) Notice: Subject to any disclaimer, the term of this patent is extended or adjusted under 35 U.S.C. 154(b) by 260 days.

(21) Appl. No.: 16/466,320

(22) PCT Filed: Sep. 22, 2017

(86) PCT No.: PCT/CN2017/102984
§ 371 (c)(1),
(2) Date: Jun. 4, 2019

(87) PCT Pub. No.: WO2018/113362
PCT Pub. Date: Jun. 28, 2018

(65) Prior Publication Data
US 2019/0312720 A1    Oct. 10, 2019

(30) Foreign Application Priority Data

Dec. 20, 2016    (CN) .......................... 201611188523.9
Dec. 26, 2016    (CN) .......................... 201611220733.1

(51) Int. Cl.
*H04L 29/06*    (2006.01)
*H04L 9/08*    (2006.01)
(Continued)

(52) U.S. Cl.
CPC ............ *H04L 9/0819* (2013.01); *G06F 21/33* (2013.01); *H04L 9/083* (2013.01); *H04L 9/0866* (2013.01);
(Continued)

(58) Field of Classification Search
CPC ..... G06F 21/33; G06F 21/606; H04L 9/0819; H04L 9/0825; H04L 9/083; H04L 9/0861;
(Continued)

(56) References Cited

U.S. PATENT DOCUMENTS

2006/0239452 A1* 10/2006 Jung ...................... H04L 63/101
380/44
2007/0214356 A1* 9/2007 Song ....................... H04L 63/08
713/156
(Continued)

FOREIGN PATENT DOCUMENTS

| CN | 101964793 | 2/2011 |
| CN | 105743654 | 7/2016 |
| CN | 106789018 | 5/2017 |

OTHER PUBLICATIONS

Hassinen, Marko, Konstantin Hyppönen, and Elena Trichina. "Utilizing national public-key infrastructure in mobile payment systems." Electronic Commerce Research and Applications 7.2 (2008): 214-231. (Year: 2008).*
(Continued)

*Primary Examiner* — Joseph P Hirl
*Assistant Examiner* — Ka Shan Choy
(74) *Attorney, Agent, or Firm* — Rankin, Hill & Clark LLP (57) ABSTRACT

A method for remotely acquiring secret key, comprising steps of detecting an injection key acquisition instruction; generating a temporary key pair when the injection key acquisition instruction is detected; acquiring a locally stored
(Continued)

private key in a random key pair, and using a private key in the random key pair to perform signature on a public key in the temporary key pair to generate a temporary key signature; acquiring a first identity authentication certificate; sending the temporary key signature and the first identity authentication certificate to a remote injection server; receiving an injection key ciphertext signature and a second identity authentication certificate which is returned by the remote injection server according to the temporary key signature and the first identity authentication certificate; and acquiring and storing an injection key according to the injection key ciphertext signature and the second identity authentication certificate.

15 Claims, 7 Drawing Sheets

(51) Int. Cl.
*G06F 21/33* (2013.01)
*H04L 9/14* (2006.01)
*H04L 9/32* (2006.01)

(52) U.S. Cl.
CPC .............. *H04L 9/14* (2013.01); *H04L 9/3247* (2013.01); *H04L 9/3268* (2013.01)

(58) Field of Classification Search
CPC ....... H04L 9/0866; H04L 9/14; H04L 9/3247; H04L 9/3263; H04L 9/3268
See application file for complete search history.

(56) References Cited

U.S. PATENT DOCUMENTS

| | | |
|---|---|---|
| 2009/0037728 A1* | 2/2009 | Kamikura ............. H04L 9/3263 713/156 |
| 2011/0054987 A1 | 3/2011 | Nicolas et al. |
| 2017/0093570 A1* | 3/2017 | Maruyama ............. H04L 9/006 |
| 2018/0018663 A1* | 1/2018 | Van ......................... H04L 9/14 |

OTHER PUBLICATIONS

International Search Report filed in PCT/CN2017/102984 dated Dec. 14, 2017.

* cited by examiner

METHOD FOR REMOTELY ACQUIRING SECRET KEY, POS TERMINAL AND STORAGE MEDIUM

CROSS-REFERENCE OF RELATED APPLICATION

This application claims priority to Chinese Patent Application No. 201611188523.9, filed with China National Intellectual Property Administration on Dec. 20, 2016, and titled "method and apparatus for remotely acquiring secret key", and claims priority to Chinese Patent Application No. 201611220733.1, filed with China National Intellectual Property Administration on Dec. 26, 2016, and titled "method and apparatus for remotely acquiring secret key", the content of which are incorporated herein by reference in entirety.

TECHNICAL FIELD

The present disclosure relates to the technical field of communications, and more particularly to a method for remotely acquiring secret key, a POS terminal and a storage medium.

BACKGROUND

With the rapid development of communication technology, more and more important information is transmitted over the network, however, due to consideration of information security in the network, information transmission in many business scopes doesn't rely on the network, instead, a relatively original method is still adopted.

However, in the technical field of payment, a POS (Point of Sale) terminal is used as one of the most common hardware devices in the financial payment system, the POS terminal needs to encrypt transaction sensitive information so as to ensure transaction security. When a secret key is injected into the POS terminal, the POS terminal needs to be delivered to a fixed secure place where the secret key is injected. In this way, the process of injecting secret key into the POS terminal is very complicated; meanwhile, the deployment cost of the POS terminal is increased, and the acquisition efficiency of secret key of the POS terminal is reduced.

SUMMARY

According to the various embodiments of the present disclosure, a method for remotely acquiring secret key, a POS terminal and a storage medium is provided.

A method for remotely acquiring secret key, including steps of:
 detecting an injection key acquisition instruction;
 generating a temporary key pair when the injection key acquisition instruction is detected;
 acquiring a locally stored private key in a random key pair, and using a private key in the random key pair to perform signature on a public key in the temporary key pair to generate a temporary key signature;
 acquiring a first identity authentication certificate;
 sending the temporary key signature and the first identity authentication certificate to a remote injection server;
 receiving an injection key ciphertext signature and a second identity authentication certificate returned by the remote injection server according to the temporary key signature and the first identity authentication certificate; and
 acquiring and storing an injection key according to the injection key ciphertext signature and the second identity authentication certificate.

A POS terminal, including a memory and a processor, and the memory stores a computer readable instruction, when the computer readable instruction is executed by the processor, the processor is configured to be caused to perform following steps of:
 detecting an injection key acquisition instruction;
 generating a temporary key pair when the injection key acquisition instruction is detected;
 acquiring a locally stored private key in a random key pair, and using a private key in the random key pair to perform signature on a public key in the temporary key pair to generate a temporary key signature;
 acquiring a first identity authentication certificate;
 sending the temporary key signature and the first identity authentication certificate to a remote injection server;
 receiving an injection key ciphertext signature and a second identity authentication certificate returned by the remote injection server according to the temporary key signature and the first identity authentication certificate; and
 acquiring and storing an injection key according to the injection key ciphertext signature and the second identity authentication certificate.

One or a plurality of non-volatile readable storage medium storing a computer readable instruction, wherein when the computer readable instruction is executed by one or more processors, the one or more processors is/are configured to be caused to perform following steps of:
 detecting an injection key acquisition instruction;
 generating a temporary key pair when the injection key acquisition instruction is detected;
 acquiring a locally stored private key in a random key pair, and using a private key in the random key pair to perform signature on a public key in the temporary key pair to generate a temporary key signature;
 acquiring a first identity authentication certificate;
 sending the temporary key signature and the first identity authentication certificate to a remote injection server;
 receiving an injection key ciphertext signature and a second identity authentication certificate returned by the remote injection server according to the temporary key signature and the first identity authentication certificate; and
 acquiring and storing an injection key according to the injection key ciphertext signature and the second identity authentication certificate.

The details of one or a plurality of embodiments in the present disclosure are presented in the following accompanying figures and descriptions. Other features, purposes and main points of the present disclosure will become obvious from the description, the accompanying figures and the claims.

BRIEF DESCRIPTION OF THE DRAWINGS

In order to explain the embodiments of the present disclosure more clearly, a brief introduction regarding the accompanying drawings that need to be used for describing the embodiments of the present disclosure or the related art is given below; it is obvious that the accompanying drawings described as follows are only some embodiments of the present disclosure, for the person of ordinary skill in the art, other drawings may also be obtained according to the current drawings on the premise of paying no creative labor.

DESCRIPTION OF THE EMBODIMENTS

Exemplary embodiments reflecting features and advantages of the present disclosure will be described in detail hereinafter. It should be understood that the present disclosure can have various variations in different implementation modes, these various variations don't break away from the protection scope of the present disclosure, and the descriptions and drawings in the present disclosure are essentially used as interpretation rather than limitation to the present disclosure.

Figure 1:
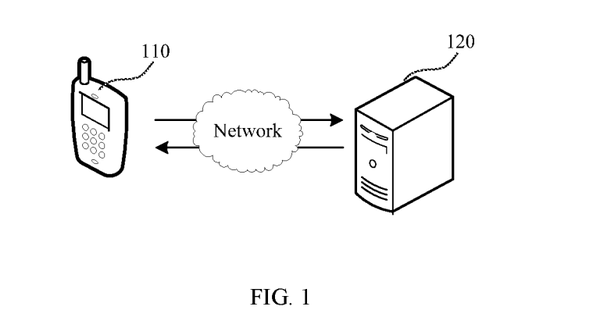
FIG. 1 depicts an application scenario of a method for remotely acquiring secret key in an embodiment of the present disclosure.

FIG. 1 depicts an application scenario diagram of a method for remotely acquiring secret key in an embodiment. Referring to FIG. 1, the method for remotely acquiring secret key is applied in a system for remotely acquiring secret key. The system for remotely acquiring secret key includes a POS (Point-of-Sale) terminal 110 and a server 120, where the POS terminal 110 is connected with a remote injection server 120 through a network. The POS terminal 110 may be a mobile terminal configured to acquire the secret key, and the mobile terminal may particularly be a POS terminal used for acquiring the secret key.

Figure 2:
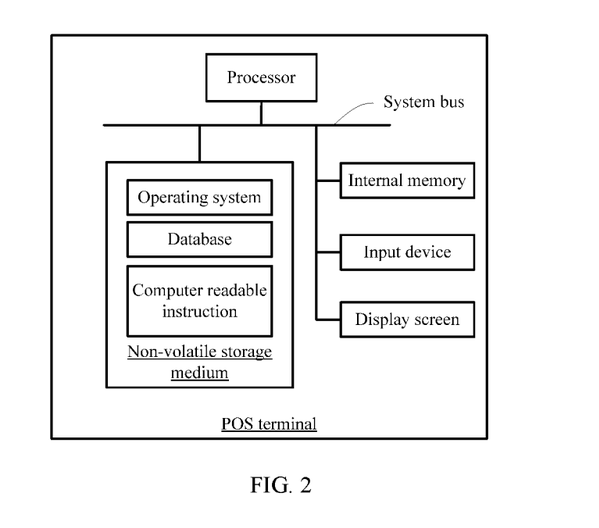
FIG. 2 depicts a schematic structural diagram of a POS in an embodiment of the present disclosure.

FIG. 2 depicts a schematic structural diagram of an internal structure of the POS terminal 110 in the system for remotely acquiring secret key shown in FIG. 1 in an embodiment. As shown in FIG. 2, the POS terminal 110 includes a processor connected through a system bus, a non-volatile storage medium, an internal memory, a display screen and an input device; where the non-volatile storage medium is configured to store an operating system and a database; the internal memory is used for storing a plurality of pieces of data. The non-volatile storage medium of the POS terminal 110 stores an operating system and a database, and further includes a method for remotely acquiring a secret key, and this device for remotely acquiring secret key is used for implementing a method for remotely acquiring secret key. The processor is configured to provide computing and control capabilities and support the operation of the entire POS terminal 110; the internal memory in the POS terminal 110 is configured to provide an environment for the operation of the device for remotely acquiring secret key in the non-volatile storage medium, a computer readable instruction may be stored in the internal memory, and when the computer readable instruction is executed by the processor, the processor may be caused to perform the method for remotely acquiring secret key.

Figure 3:
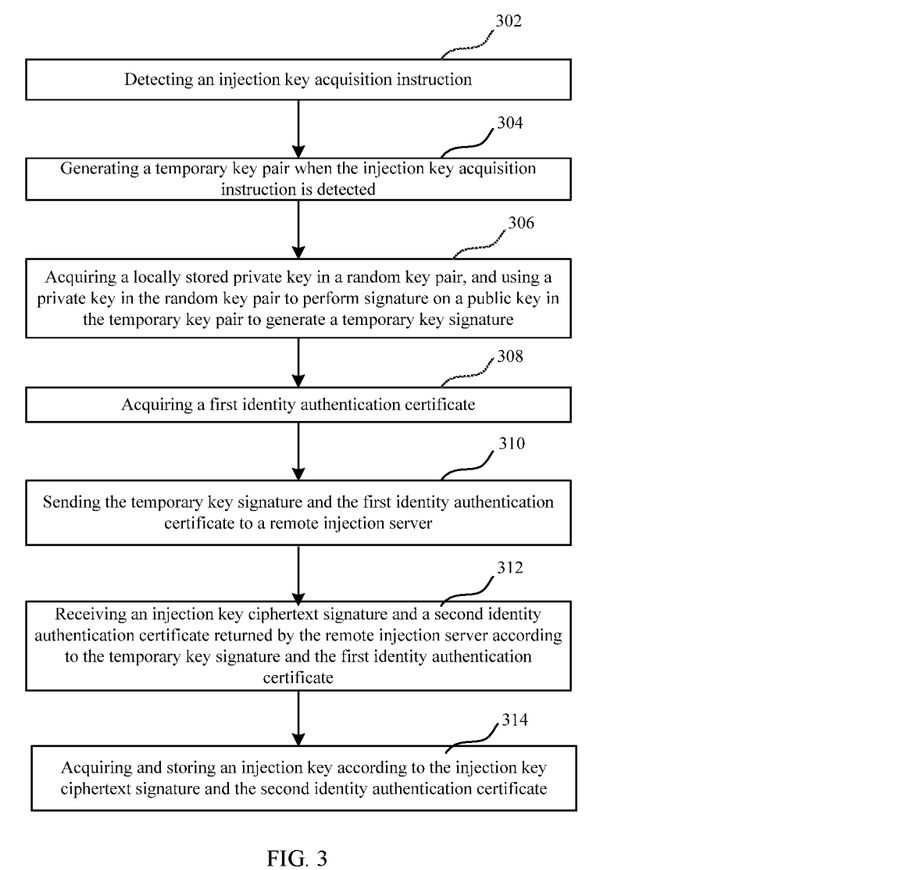
FIG. 3 depicts a schematic flow diagram of the method for remotely acquiring secret key in an embodiment of the present disclosure.

FIG. 3 depicts a schematic flow diagram of a method for remotely acquiring secret key according to an embodiment of the present disclosure. It should be understood that, although the various steps in the flow diagram of FIG. 3 are sequentially displayed according to the indication of arrow, these steps are not necessarily performed sequentially according to the order indicated by the arrow, unless there are clear descriptions in the present disclosure, these steps need not be performed in a strict order, these steps may be performed sequentially according to some other orders. Moreover, at least some steps in FIG. 3 may include multiple sub-steps or multiple stages, and performing of these sub-steps or stages are not necessarily completed at the same time, instead, these sub-steps or stages may be performed at different time points; these sub-steps or stages are unnecessarily performed in order, either; instead, these sub-steps or stages may be implemented orderly or alternatively with other steps or sub-steps of other steps or at least a part of a stage.

As shown in FIG. 3, in one embodiment, a method for remotely acquiring secret key is provided, and this embodiment is described by taking the method which is applied in the POS terminal 110 in the system for remotely acquiring secret key in FIG. 1 for example. This method particularly includes the steps as follows:

S302, detecting an injection key acquisition instruction.

Particularly, an operator inputs an injection key acquisition instruction through an input device of the POS terminal 110, where the injection key acquisition instruction refers to an instruction used for acquiring an injection key from a remote injection server. The POS terminal 110 is configured to detect whether there is the input injection key acquisition instruction as input by the operator.

In one embodiment, the operator starts the POS terminal 110 through the input device of the POS terminal 110, the POS terminal 110 displays an input identity authentication information on the display screen. The operator inputs identity authentication information through the input device of the POS terminal 110. The POS terminal 110 acquires the input identity authentication information and compares the acquired identity authentication information with locally stored identity authentication information, verification of the identity authentication information is passed if the identity authentication information is consistent with the locally stored identity authentication information. An injection key acquisition instruction is triggered if the verification of the identity authentication information is passed. The identity authentication information may particularly be at least one of a merchant name, a name, a bank account number, and a password.

S304, generating a temporary key pair when the injection key acquisition instruction is detected.

Particularly, the POS terminal 110 generates the temporary key pair after the injection key acquisition instruction is detected, where the temporary key pair includes a private key and a public key. The POS terminal 110 may delete the temporary key pair after the injection key is acquired. The POS terminal 110 may be particularly configured to generate the temporary key pair randomly, and to select one pair of secret key pair from a secret key pool and use the selected secret key pair as the temporary key pair.

S306: acquiring a private key stored locally in a random key pair, and performing signature on the public key in the temporary key using the private key in the random key pair to generate a temporary key signature.

Particularly, the POS terminal 110 stores the private key in the random key pair locally when the random key pair is generated. After the temporary key pair is generated, the POS terminal 110 extracts the private key in the locally stored random key pair and the public key in the temporary key pair, calculates the public key in the temporary key pair to obtain a hash value, encrypts the calculated hash value using the private key in the random key pair, and adds the hash value into the tail of the public key in the temporary key pair to generate the temporary key signature.

S308, acquiring a first identity authentication certificate.

Particularly, the first identity authentication certificate is the information which is issued by a certificate issuance server in the production process and is used for indicating the identity of the POS terminal 110. The POS terminal 110 may particularly obtain the first identity authentication certificate from the certificate issuance server, and may also extract the stored first identity authentication certificate locally. The first identity authentication certificate includes signature information issued by the certificate issuance server. The first identity authentication certificate may include at least one from the public key in the random key pair, information of the manufacturer which produces the POS terminal 110, and a device identifier of the POS terminal 110.

S310, sending the temporary key signature and the first identity authentication certificate to the remote injection server.

Particularly, the POS terminal 110 is configured to send the generated temporary key signature and the acquired first identity authentication certificate to the remote injection server 120, the remote injection server 120 is configured to verify the identity of the POS terminal 110 through the first identity authentication certificate and extract the public key in the temporary key pair from the temporary key signature after verification of the identity of the POS terminal 110 is passed, where the public key in the temporary key pair is stored in the temporary key signature.

S312, receiving an injection key ciphertext signature and a second identity authentication certificate which are returned by the remote injection server according to the temporary key signature and the first identity authentication certificate.

Particularly, the remote injection server 120 acquires the second identity authentication certificate, where the second identity authentication certificate is the information issued by the certificate issuance server and is used for indicating the identity of the remote injection server 120. The remote injection server 120 verifies the first identity authentication certificate using an issuance public key. After verification of the first identity authentication certificate is passed, the remote injection server 120 extracts the public key in the temporary key pair from the temporary key signature, uses the public key in the temporary key pair extracted from the temporary key signature to encrypt the injection key so as to acquire an injection key ciphertext, and uses a authentication private key corresponding to a authentication public key in the second identity authentication certificate to perform signature on the injection key ciphertext so as to acquire the injection key ciphertext signature, where the public key in the temporary key pair is stored in the temporary key signature. The remote injection server 120 sends the injection key ciphertext signature and the second identity authentication certificate to the POS terminal 110.

In one embodiment, particularly, S312 further includes: receiving the injection key ciphertext signature and the second identity authentication certificate returned by the remote injection server after verification of the first identity authentication information is passed by the remote injection server; where the injection key ciphertext signature is generated by the remote injection server by performing signature on the injection key ciphertext using the authentication private key corresponding to the authentication public key in the second identity authentication certificate; the injection key ciphertext is acquired by the remote injection server by encrypting the injection key using the public key in the temporary key signature.

Particularly, after receiving the temporary key signature and the first identity authentication information sent by the POS terminal 110, the remote injection server 120 extracts the issuance public key issued by the certificate issuance server and performs signature verification on the signature information in the first identity authentication certificate. After the verification is passed, the public key in the first identity authentication certificate is extracted, and the extracted public key is the public key in the random key pair. The remote injection server 120 verifies signature information in the temporary key signature using the public key in the random key pair, if the verification of the signature information is passed, the public key in the temporary key signature is extracted, and the extracted public key is the public key in the temporary key pair. The remote injection server 120 encrypts the injection key using the public key in the temporary key pair to obtain the injection key ciphertext, and then use the authentication private key corresponding to the authentication public key in the second identity authentication certificate to perform signature on the injection key ciphertext so as to acquire the injection key ciphertext signature. The remote injection server 120 sends the second identity authentication certificate and the injection key ciphertext signature to the POS terminal 110. The POS terminal 110 receives the second identity authentication certificate and the injection key ciphertext signature sent by the remote injection server 120.

S314: acquiring and storing the injection key according to the injection key ciphertext signature and the second identity authentication certificate.

Particularly, the POS terminal 110 verifies the identity of the remote injection server 120 through the second identity authentication certificate. After verification of the identity of the remote injection server 120 is passed by the POS terminal 110, signature verification is performed on the signature information of the injection key ciphertext signature, after the signature verification is passed, the injection key is extracted from the injection key ciphertext signature, and the extracted injection key is stored. Where the injection key may be a MK (Main Key), or a DUKPT (Derived Unique Key per Transaction) initial secrete key.

In this embodiment, when an injection key acquisition instruction is detected, a temporary key pair is generated, and the locally stored private key in the random key pair is used to perform signature on the public key in the temporary key pair so as to acquire the temporary key signature, and the acquired first identity authentication certificate and the temporary key signature are sent to the remote injection server, the injection key ciphertext signature and the second identity authentication certificate which are returned by the remote injection server according to the temporary key signature and the first identity authentication certificate are received, the injection key is acquired and stored according to the injection key ciphertext signature and the second identity authentication certificate. According to the plurality of pairs of key pairs, various secret key signatures, the first identity authentication certificate and the second identity authentication certificate, the safety of transmission of the secret key is guaranteed, under the condition that the safety of transmission of secret key is guaranteed, the secret key is acquired from the remote injection server, a step of acquiring secret key at a fixed place is avoided, a transportation cost is reduced, an acquisition process of secret key is simplified, time spent on acquiring the secret key is shortened, and an acquisition efficiency of secret key is improved.

Figure 4:
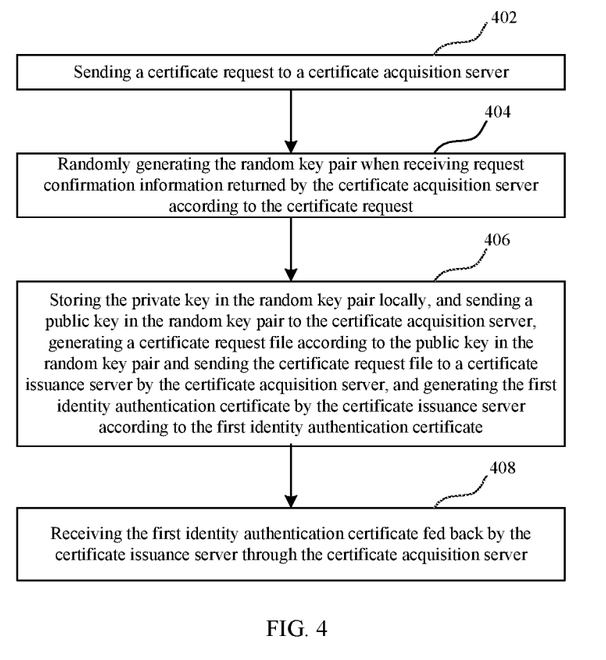
FIG. 4 depicts a schematic flow diagram of a step of generating identity authentication certificate in an embodiment of the present disclosure.

As shown in FIG. 4, in one embodiment, before step 302, this method further includes a step of generating identity authentication certificate, which particularly includes the following steps:

S402, sending a certificate request to a certificate acquisition server.

Particularly, the POS terminal 110 acquires its device identifier and generates the certificate request according to the device identifier, and sends the certificate request to the certificate acquisition server. Particularly, the certificate request can be received and sent to the certificate acquisition server through an USB interface or a serial interface. The device identifier is the unique identifier of the POS terminal 110, and may be a product serial number.

S404: randomly generating a random key pair upon receiving request confirmation information returned by the certificate acquisition server according to the certificate request.

Particularly, after the certificate request sent by the POS terminal 110 is received by the certificate acquisition server, the certificate acquisition server extracts the device identifier in the certificate request, verifies the device identifier to determine whether the device identifier is affiliated with a manufacturer. Particularly, whether the device identifier is affiliated with naming notation of the manufacturer is verified. After the certificate acquisition server verifies that the device identifier is affiliated with the manufacturer, the certificate acquisition server sends the request confirmation information to the POS terminal 110 and establishes a connection with the POS terminal. After the request confirmation information is received, the POS terminal 110 randomly generates the random key pair, where the random key pair includes a private key and a public key.

S406: storing the private key in the random key pair locally, and sending the public key in the random key pair to the certificate acquisition server, generating a certificate request file according to the public key in the random key pair and sending the certificate request file to the certificate issuance server by the certificate acquisition server, and generating the first identity authentication certificate by the certificate issuance server according to the certificate request file.

Particularly, the POS terminal 110 stores the private key in the random key pair locally and sends the public key in the random key pair to the certificate acquisition server. After the public key in the random key pair is received, the certificate acquisition server acquires manufacturer information, and generates the certificate request file according to the public key in the random key pair and the manufacturer information. The certificate request file may further include at least one of a device identifier and request time. The certificate acquisition server sends the generated certificate request file to the certificate issuance server. The certificate issuance server performs signature on the certificate request file using the issued private key and the first identity authentication certificate is acquired. The issued private key is corresponding to an issuance public key.

S408, receiving the first identity authentication certificate fed back by the certificate issuance server through the certificate acquisition server.

Particularly, after the first identity authentication certificate is generated, the certificate issuance server sends the first identity authentication certificate to the certificate acquisition server. The certificate acquisition server forwards the received first identity authentication certificate to the POS terminal 110, the POS terminal 110 receives the first identity authentication certificate forwarded by the certificate acquisition server.

In this embodiment, the randomly generated public key in the random key pair is sent to the certificate acquisition server, the certificate acquisition server generates the certificate request file according to the public key in the random key pair, and sends the certificate request file to the certificate issuance server, such that the certificate issuance server performs signature on the certificate request file to obtain the first identity authentication certificate, and the safety of data in transaction process is guaranteed according to the first identity authentication certificate.

Figure 5:
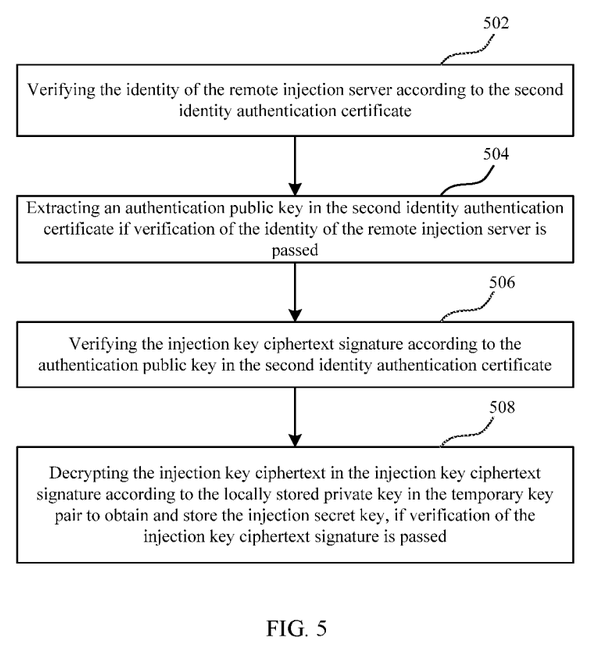
FIG. 5 depicts a schematic flow diagram of a step of acquiring an injection key in an embodiment of the present disclosure.

As shown in FIG. 5, in one embodiment, the step 314 includes a step of acquiring the injection key, and this step particularly includes:

S502, verifying the identity of the remote injection server according to the second identity authentication certificate.

Particularly, after receiving the second identity authentication certificate and the injection key ciphertext signature sent by the remote injection server 120, the POS terminal 110 extracts the local issuance public key and use the issuance public key to verify the signature information in the second identity authentication certificate.

S504, extracting the authentication public key in the second identity authentication certificate if the identity of the remote injection server is verified.

Particularly, if verification of the signature information in the second identity authentication certificate is passed by the POS terminal 110, verification of the identity of the remote injection server 120 would also be passed by the POS terminal 110. The POS terminal 110 extracts the certificate request file in the second identity authentication certificate, and acquires the authentication public key from the extracted certificate request file.

S506, verifying the injection key ciphertext signature according to the authentication public key in the second identity authentication certificate.

Particularly, the POS terminal 110 extracts the signature information in the injection key ciphertext signature and the original text corresponding to the signature information, uses the extracted authentication public key to decrypt the signature information in the injection key ciphertext signature so as to obtain a hash value corresponding to the injection key ciphertext signature, uses a hash algorithm to calculate the original text corresponding to the extracted signature information, and compares the extracted hash value with a calculated hash value; if the extracted hash value is consistent with the calculated hash value, verification of the secret key ciphertext signature is passed; if the extracted hash value is inconsistent with the calculated hash value, the verification of the secret key ciphertext signature is not passed.

S508, decrypting the injection key ciphertext in the injection key ciphertext signature according to the locally stored private key in the temporary key pair to acquire and store the injection key, if the verification of the secret key ciphertext signature is passed.

Particularly, if the verification of the secret key ciphertext signature is passed by the POS terminal 110, the locally stored private key in the temporary key pair is extracted, the injection key ciphertext is extracted from the injection key ciphertext signature, and the private key in the extracted temporary key pair is used to decrypt the injection key ciphertext to acquire the injection key, and the acquired injection key is stored locally.

In this embodiment, after the second identity authentication certificate and the injection key ciphertext signature are acquired, the identity of the remote injection server is verified according to the second identity authentication certificate, after the verification of the identity of the remote injection server is passed, the authentication public key in the second identity authentication certificate is used to verify the injection key ciphertext signature, after the verification of the injection key ciphertext signature is passed, the private key in the temporary key pair is used to decrypt the injection key ciphertext so as to acquire the injection key. The accuracy and the safety of the acquired injection key are guaranteed through multi-verification or multi-decryption, and the injection key is avoided from being revealed.

Figure 6:
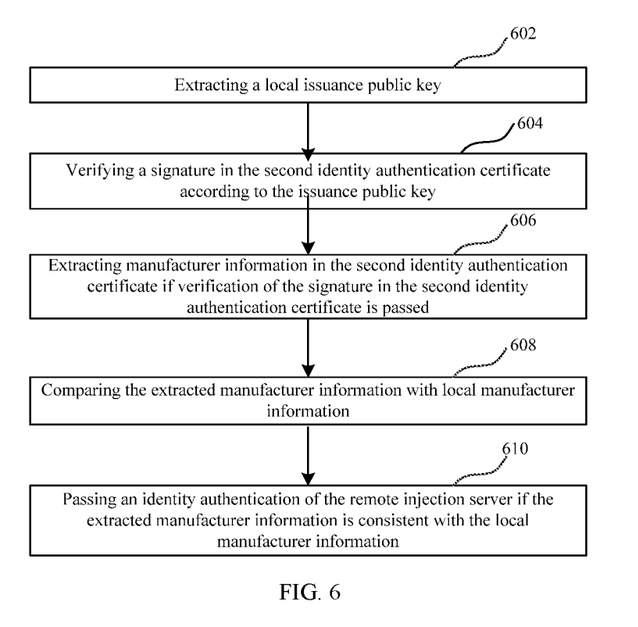
FIG. 6 depicts a schematic flow diagram of a step of verifying the identity of a remote injection server in an embodiment of the present disclosure.

As shown in FIG. 6, in one embodiment, S502 particularly includes a step of verifying the identity of the remote injection server, this step includes the contents as follows:

S602, extracting the local issuance public key.

Particularly, the POS terminal 110 locally stores the issuance public key issued by the certificate issuance server, and the issued private key is stored in the certificate issuance server, and the issuance public key stored locally by the POS terminal 110 is the same as the issuance public key stored in the remote injection server 120. Where, the issuance public key is corresponding to the issued private key.

S604, verifying the signature in the second identity authentication certificate according to the issuance public key.

Particularly, the signature information in the second identity authentication certificate and the original text corresponding to the signature information are extracted, and the issuance public key is used to decrypt the signature information so as to obtain the hash value, the original text corresponding to the signature information is calculated by a hash algorithm and a hash value is obtained, and the decrypted hash value is compared with the hash value obtained by calculation, if the decrypted hash value is consistent with the calculated hash value, the verification of the signature in the second identity authentication certificate is passed, if the decrypted hash value is inconsistent with the calculated hash value, the verification of the signature in the second identity authentication certificate is not passed.

S606, extracting the manufacturer information in the second identity authentication certificate, if signature verification of the second identity authentication certificate is passed.

Particularly, the POS terminal 110 extracts the certificate request file in the second identity authentication certificate, parses the certificate request file and extracts manufacturer information in the certificate request file. The manufacturer information can be manufacturer identifier and can also include at least one of a manufacturer address, a manufacturer legal person and a manufacturer telephone number. The manufacturer identifier may be at least one of a manufacturer name and a manufacturer registration code.

S608, comparing the extracted manufacturer information with the local manufacturer information.

Particularly, the POS terminal 110 acquires locally stored manufacturer information and compares the local manufacturer information with the extracted manufacturer information.

S610, allowing verification of the identity of the remote injection server to be passed if the extracted manufacturer information is consistent with the local manufacturer information.

Particularly, when the POS terminal 110 compares the local manufacturer information with the extracted manufacturer information, if the local manufacturer information is consistent with the extracted manufacturer information, verifying the identity of the remote injection server 120 according to the second identity authentication certificate is passed; if the local manufacturer information is inconsistent with the extracted manufacturer information, verifying the remote injection server 120 according to the second identity authentication certificate is not passed.

In this embodiment, after the signature information of the second identity authentication certificate is verified using the issuance public key, and the local manufacturer information is compared with the manufacturer information in the second identity authentication certificate, an identity authentication of the remote injection server is performed by comparing the manufacturer information, thus, it is guaranteed that the remote injection server is affiliated with the secret key injection server designated by the manufacturer, and the safety in acquisition process of the secret key is guaranteed.

Figure 7:
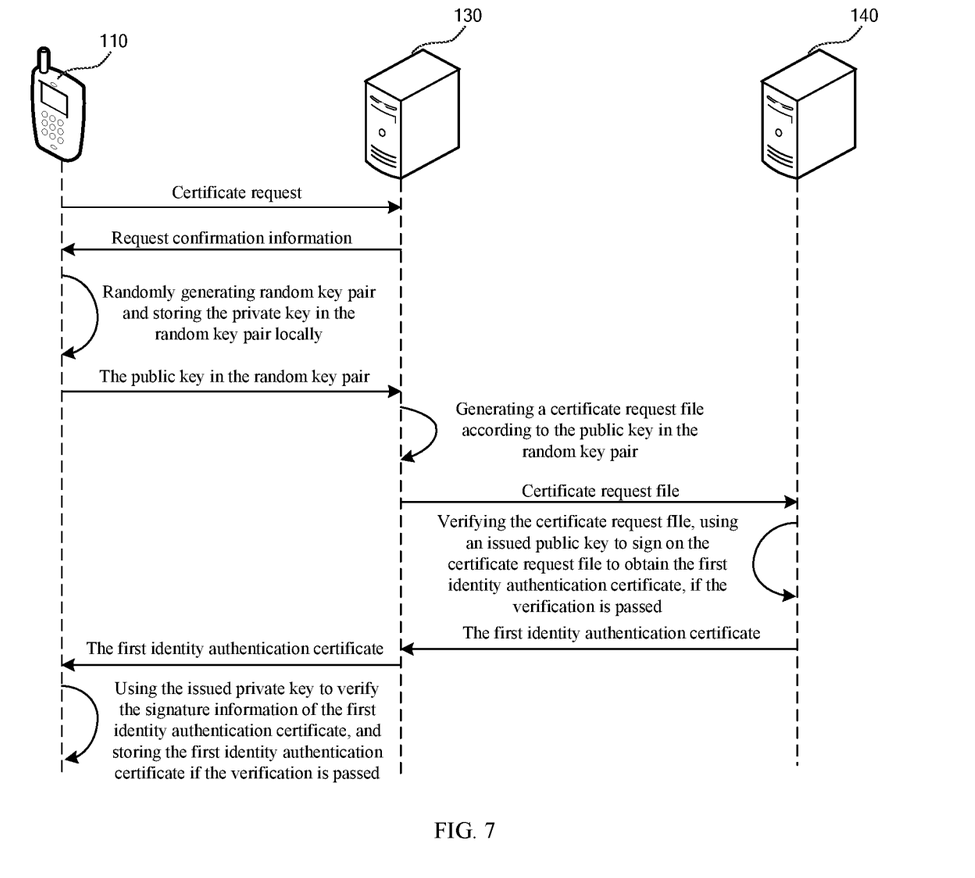
FIG. 7 depicts a time sequence diagram of a step of generating an identity authentication certificate in an embodiment of the present disclosure.

As shown in FIG. 7, in one embodiment, the step 302 also includes a step of generating the identity authentication certificate, this step involves the POS terminal 110, the certificate acquisition server 130 and the certificate issuance server 140, and particularly includes the contents as follows:

The POS terminal 110 sends a certificate request to the certificate acquisition server 130, the certificate acquisition server 130 returns request confirmation information to the POS terminal 110 according to the certificate request. The POS terminal 110 randomly generates the random key pair when the request confirmation information is received and stores the private key in the random key pair locally, and sends the public key in the random key pair to the certificate acquisition server 130.

The certificate acquisition server 130 generates the certificate request file according to the public key in the random key pair, and sends the certificate request file to the certificate issuance server 140. The certificate request file may also include at least one of the manufacturer information, a request time and a device identifier.

Verifying the received certificate request file by the certificate issuance server 140 may specifically be verifying theme information in the certificate request file, and the theme information may be manufacturer identifier. After verification of the certificate request file is passed, the issued private key corresponding to the manufacturer identifier is used to perform signature on the certificate request file to obtain the first identity authentication certificate, and the first identity authentication certificate is sent to the certificate acquisition server 130 which forwards the first identity authentication certificate to the POS terminal 110.

After the first identity authentication certificate is received by the POS terminal 110, the POS terminal 110 uses the issuance public key corresponding to the issued private key to verify the signature information in the first identity authentication certificate, and stores the first identity authentication certificate if the verification of the signature information in the first identity authentication certificate is passed.

Figure 8:
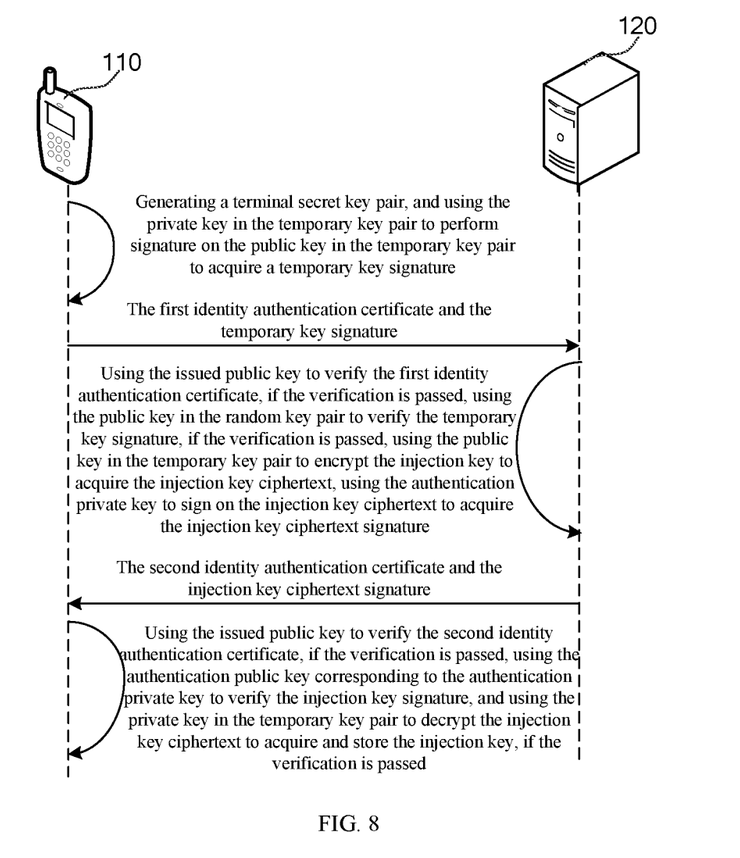
FIG. 8 depicts a time sequence diagram of the method for remotely acquiring secret key in an embodiment of the present disclosure.

As shown in FIG. 8, in one embodiment, a method for remotely acquiring secret key is provided, and this method particularly includes the following contents:

After the first identity authentication certificate is received by the POS terminal 110, the POS terminal 110 generates the temporary key pair when an injection key acquisition instruction is detected, and uses the private key in the locally stored random key pair to perform signature on the public key in the temporary key pair to obtain a temporary key signature. The POS terminal 110 sends the first identity authentication certificate and the temporary key signature to the secret key remote injection server 120.

The remote injection server 120 verifies the signature information in the first identity authentication certificate using the issuance public key, if verification of the signature information in the first identity authentication certificate is passed, the public key in the first identity authentication certificate is extracted, and the extracted public key is the public key in the random key pair. The remote injection server 120 verifies the signature information in the temporary key signature using the public key in the random key pair, if the verification of the signature information in the temporary key signature is passed, the public key in the temporary key signature is extracted, and the extracted public key is the public key in the temporary key pair; the public key in the temporary key pair is used to decrypt the injection key so as to obtain the injection key ciphertext. The remote injection server 120 performs signature on the injection key ciphertext using the authentication private key corresponding to the authentication public key to obtain the injection key ciphertext signature. The second identity authentication certificate and the injection key ciphertext signature are sent to the POS terminal 110.

The POS terminal 110 verifies the signature information of the second identity authentication certificate using the issuance public key, if the verification of the signature information of the second identity authentication certificate is passed, the authentication public key in the second identity authentication certificate is extracted, and the authentication public key is used to verify the signature information of the secret key ciphertext signature; if the verification of the signature information of the second identity authentication certificate is not passed, error message is returned. If the verification of the signature information in the injection key ciphertext signature is passed, the injection key ciphertext in the injection key ciphertext signature is extracted, and the locally stored private key in the temporary key pair is used to decrypt the injection key ciphertext so as to acquire and store the injection key, and the temporary key pair is deleted.

In this embodiment, generating and acquiring as performed by the POS terminal 110 only need an issued public key, so that the production process is simplified. After the POS terminal 110 leaves the factory, the POS terminal 110 need not to be delivered to a fixed place to obtain the secret key, the acquisition process of the secret key is simplified, the transportation cost is saved, and time spent on acquiring the secret key is saved. The private key in the random key pair is directly stored locally, such that the private key cannot be acquired by the external equipment, the safety of the secret key is guaranteed. Through a bidirectional identity authentication between the POS terminal 110 and the remote injection server, the legality of identities of the POS terminal 110 and the remote injection server are guaranteed. The secret key pair configured to encrypt the injection key and the random key pair configured to perform identity authentication are distinguished from each other, a transmission error due to mixing use of secret key is avoided, and an acquisition efficiency of secret key is improved.

Figure 9:
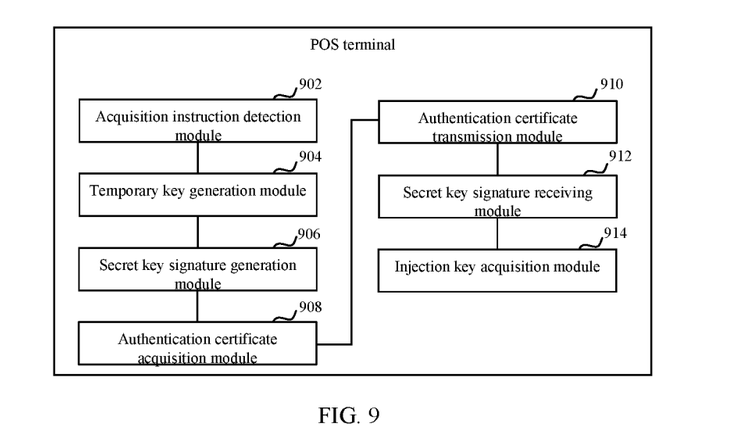
FIG. 9 depicts a structural block diagram of one POS terminal in an embodiment of the present disclosure.

As shown in FIG. 9, in one embodiment, the present application further provides a POS terminal, the inner structure of the POS terminal can be corresponding to the structure as shown in FIG. 2, each of the modules described below can be implemented partially or wholly by software, hardware or the combination of software and hardware, the POS terminal may particularly include the modules as follows: an acquisition instruction detection module 902, a temporary key generation module 904, a secret key signature generation module 906, an authentication certificate acquisition module 908, an authentication certificate transmission module 910, a secret key signature receiving module 912 and an injection key acquisition module 914.

The acquisition instruction detection module 902 is configured to detect an injection key acquisition instruction;

the temporary key generation module 904 is configured to generate a temporary key pair when the injection key acquisition instruction is detected;

the secret key signature generation module 906 is configured to acquire the locally stored private key in the random key pair, and to use the private key in the random key pair to perform signature on a public key in a temporary key pair so as to obtain a temporary key signature;

the authentication certificate acquisition module 908 is configured to acquire a first identity authentication certificate;

the authentication certificate transmission module 910 is configured to transmit the temporary key signature and the first identity authentication certificate to a remote injection server;

the secret key signature receiving module 912 is configured to receive an injection key ciphertext signature and a second identity authentication certificate which are returned by the remote injection server according to the temporary key signature and the first identity authentication certificate;

The injection key acquisition module 914 is configured to acquire and store the injection key according to the injection key ciphertext signature and the second identity authentication certificate.

In one embodiment, the secret key signature receiving module 912 is further configured to receive the injection key ciphertext signature and the second identity authentication certificate which are returned by the remote injection server after verification of the first identity authentication information is passed by the remote injection server; the injection key ciphertext signature is generated by the remote injection server by performing signature on the injection key ciphertext using an authentication private key corresponding to an authentication public key in the second identity authentication certificate; the injection key ciphertext is acquired by the remote injection server by encrypting the injection key using the public key in the temporary key signature.

In this embodiment, when an injection key acquisition instruction is detected, a temporary key pair is generated, and the locally stored private key in the random key pair is used to perform signature on the public key in the temporary key pair to acquire the temporary key signature, and the acquired first identity authentication certificate and the temporary key signature are sent to the remote injection server, the injection key ciphertext signature and the second identity authentication certificate which are returned by the remote injection server according to the temporary key signature and the first identity authentication certificate are received, the injection key is acquired and stored according to the injection key ciphertext signature and the second identity authentication certificate. According to the plurality of pairs of secret key pairs, various secret key signatures, the first identity authentication certificate and the second identity authentication certificate, the safety of transmission of the secret key is guaranteed, under the condition that the safety of transmission of secret key is guaranteed, the secret key is acquired from the remote injection server, a step of acquiring secret key at a fixed place is avoided, transportation cost is reduced, an acquisition process of secret key is simplified, time spent on acquiring the secret key is shortened, and an acquisition efficiency of secret key is improved.

Figure 10:
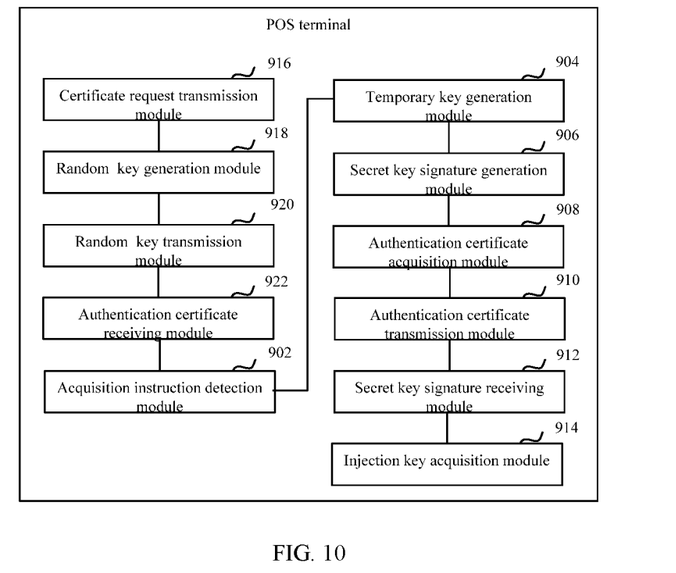
FIG. 10 depicts a structural block diagram of another POS terminal in an embodiment of the present disclosure.

As shown in FIG. 10, in one embodiment, the POS terminal particularly includes a certificate request transmission module 916, a random key generation module 918, a random key transmission module 920 and an authentication certificate receiving module 922.

The certificate request transmission module 916 is configured to transmit a certificate request to the certificate acquisition server.

The random key generation module 918 is configured to generate a random key pair randomly upon receiving the request confirmation information which is returned by the certificate acquisition server according to the certificate request.

The random key transmission module 920 is configured to store the private key in the random key pair locally and send the public key in the random key pair to the certificate acquisition server, where the certificate obtaining server generates a certificate request file according to the public key in the random key pair and sends the certificate request file to the certificate issuance server, and the certificate issuance server generates a first identity authentication certificate according to the certificate request file.

The authentication certificate receiving module 922 is configured to receive the first identity authentication certificate fed back by the certificate issuance server through the certificate acquisition server.

In this embodiment, the randomly generated public key in the random key pair is sent to the certificate acquisition server, the certificate acquisition server generates the certificate request file according to the public key in the random key pair, and sends the certificate request file to the certificate issuance server, such that the certificate issuance server performs signature on the certificate request file to obtain the first identity authentication certificate, and the safety of data in transaction process is guaranteed according to the first identity authentication certificate.

Figure 11:
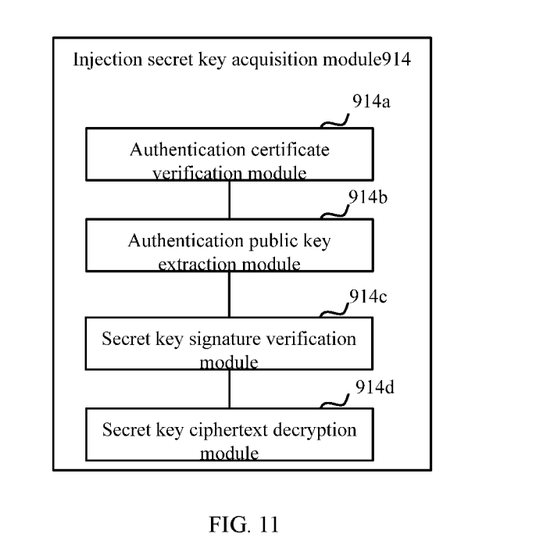
FIG. 11 depicts a structural block diagram of an injection key acquisition module in an embodiment of the present disclosure.

As shown in FIG. 11, in one embodiment, the injection key acquisition module 914 particularly includes an authentication certificate verification module 914a, an authentication public key extraction module 914b, a secret key signature verification module 914c and a secret key ciphertext decryption module 914d.

The authentication certificate verification module 914a is configured to verify the identity of the remote injection server according to the second identity authentication certificate.

The authentication public key extraction module 914b is configured to extract an authentication public key from the second identity authentication certificate after identity verification of the remote injection server is passed.

The secret key signature verification module 914c is configured to verify the injection key ciphertext signature according to the authentication public key in the second identity authentication certificate.

The secret key ciphertext decryption module 914d is configured to decrypt the injection key ciphertext in the injection key ciphertext signature using the locally stored private key in the temporary key pair so as to acquire and store the injection key, after verifying the injection key ciphertext signature according to the authentication public key in the second identity authentication certificate is passed.

In one embodiment, the authentication certificate verification module 914a is further configured to extract the local issuance public key and verify the signature in the second identity authentication certificate according to the issuance public key; if verification of the signature in the second identity authentication certificate is passed, the manufacturer information in the second identity authentication certificate is extracted, and the extracted manufacturer information is compared with the local manufacturer information; if the extracted manufacturer information is consistent with the local manufacturer information, verification of the identity of the remote injection server is passed.

In this embodiment, after the signature information of the second identity authentication certificate is verified using the issuance public key, and the local manufacturer information is compared with the manufacturer information in the second identity authentication certificate, an identity authentication of the remote injection server is performed by comparing manufacturer information, so that it is guaranteed that the remote injection server is affiliated with the secret key injection server designated by the manufacturer, and the safety in acquisition process of the secret key is guaranteed.

As used in the present disclosure, terms such as "component", "module", "system", etc., which are intended to represent a computer related entity, can be hardware, the combination of hardware and software, software, or software in execution. For example, the component may be but is not limited to a process executing on a processor, a processor, an object, an executable code, a thread in execution, program and/or computer. For description, both applications performed on a server and the server can be the component, one or a plurality of components may be resident in the process and/or the executable thread; moreover, the component may be located in one single computer and/or be distributed between/among two or more computers.

The term "component" or "module" as used herein means but is not limited to software or hardware component such as a FPGA (Field Programmable Gate Array) or an ASIC (Application Specific Integrated Circuit) for executing a specific task. The component or the module may be advantageously configured to reside in an addressable storage medium and is configured to be executed on one or more processors. Accordingly, the component or the module may include such as a software component, an object-oriented software component, the component of a class component and a task component, a processing, a functionality, an attribute, a process, a subprogram, a program code segment, a driver, a firmware, a micro-code, a circuit, a data, a database, a data structure, a table, an array and a variable by way of example. Functions which are set according to the component, and the component and the module may be combined into fewer components, and components or modules, or be further divided into additional component, and the component or the module.

The person of ordinary skilled in the art may be aware of that, a whole or part of flow process of implementing the method in the aforesaid embodiments of the present disclosure may be accomplished by using computer program to instruct relevant hardware. When the computer program is executed, the steps in the various method embodiments described above may be included. Where, the storage medium may be ROM (Read-Only Memory), RAM (Random Access Memory), and so on.

The various technical features in the aforesaid embodiments may be combined arbitrarily, for describing conveniently, all possible combinations of the various technical features in the embodiments described above are not described, however, the combinations of these technical features should all be considered as falling within the protection scope of the description as long as the combinations of these technical features are not contradicted with each other.

The foregoing are merely preferred embodiments of the present disclosure and are not intended to limit the implementation solution of the present disclosure. The person of ordinary skill in the art may modify or amend the present disclosure conveniently with reference to the main idea and the spirit, thus, the protection scope of the present disclosure should be subjected to the protection scope as requested by the claims.

What is claimed is:

1. A method for remotely acquiring secret key, comprising:
    detecting an injection key acquisition instruction;
    generating a temporary key pair when the injection key acquisition instruction is detected;
    acquiring a locally stored private key in a random key pair, and using a private key in the random key pair to perform signature on a public key in the temporary key pair to generate a temporary key signature;
    acquiring a first identity authentication certificate;
    sending the temporary key signature and the first identity authentication certificate to a remote injection server;
    receiving an injection key ciphertext signature and a second identity authentication certificate returned by the remote injection server according to the temporary key signature and the first identity authentication certificate; and
    acquiring and storing an injection key according to the injection key ciphertext signature and the second identity authentication certificate.

2. The method according to claim 1, wherein before said detecting the injection key acquisition instruction the method further comprises steps of:
    sending a certificate request to a certificate acquisition server;
    randomly generating the random key pair when receiving request confirmation information returned by the certificate acquisition server according to the certificate request;
    storing the private key in the random key pair locally, and sending a public key in the random key pair to the certificate acquisition server, generating a certificate request file according to the public key in the random key pair and sending the certificate request file to a certificate issuance server by the certificate acquisition server, and generating the first identity authentication certificate by the certificate issuance server according to the first identity authentication certificate; and
    receiving the first identity authentication certificate fed back by the certificate issuance server through the certificate acquisition server.

3. The method according to claim 1, wherein the step of acquiring and storing the injection key according to the injection key ciphertext signature and the second identity authentication certificate comprises:
    verifying an identity of the remote injection server according to the second identity authentication certificate;
    extracting an authentication public key in the second identity authentication certificate if verification of the identity of the remote injection server is passed;
    verifying the injection key ciphertext signature according to the authentication public key in the second identity authentication certificate; and
    decrypting an injection key ciphertext in the injection key ciphertext signature according to the locally stored private key in the temporary key pair to obtain and store the injection key, if verification of the injection key ciphertext signature is passed.

4. The method according to claim 3, wherein the step of verifying the identity of the remote injection server according to the second identity authentication certificate comprises:
    extracting a local issuance public key;
    verifying a signature in the second identity authentication certificate according to the issuance public key;
    extracting manufacturer information in the second identity authentication certificate, if verification of the signature in the second identity authentication certificate is passed;
    comparing the extracted manufacturer information with local manufacturer information; and
    passing an identity authentication of the remote injection server, if the extracted manufacturer information is consistent with the local manufacturer information.

5. The method according to claim 1, wherein the step of receiving the injection key ciphertext signature and the second identity authentication certificate returned by the remote injection server according to the temporary key signature and the first identity authentication certificate comprises:
    receiving the injection key ciphertext signature and the second identity authentication certificate returned by the remote injection server after verification of the first identity authentication information is passed by the remote injection server; wherein the injection key ciphertext signature is generated by the remote injection server by performing a signature on the injection key ciphertext using an authentication secret key corresponding to an authentication public key in the second identity authentication certificate, and wherein the injection key ciphertext is acquired by the remote injection server by encrypting the injection key using the public key in the temporary key signature.

6. A Point of Sale (POS) terminal, comprising a memory and a processor, and the memory stores a computer readable instruction, wherein when the computer readable instruction is executed by the processor, the processor is configured to be caused to perform following steps of:
    detecting an injection key acquisition instruction;
    generating a temporary key pair when the injection key acquisition instruction is detected;
    acquiring a locally stored private key in a random key pair, and using a private key in the random key pair to perform signature on a public key in the temporary key pair to generate a temporary key signature;
    acquiring a first identity authentication certificate;

sending the temporary key signature and the first identity authentication certificate to a remote injection server;
receiving an injection key ciphertext signature and a second identity authentication certificate returned by the remote injection server according to the temporary key signature and the first identity authentication certificate; and
acquiring and storing an injection key according to the injection key ciphertext signature and the second identity authentication certificate.

7. The POS terminal according to claim 6, wherein before the injection key acquisition instruction is detected, the processor is further configured to be caused by the computer readable instruction to perform the following steps of:
sending a certificate request to a certificate acquisition server;
randomly generating the random key pair when receiving request confirmation information which is returned by the certificate acquisition server according to the certificate request;
storing the private key in the random key pair locally, and sending a public key in the random key pair to the certificate acquisition server, generating a certificate request file according to the public key in the random key pair and sending the certificate request file to a certificate issuance server by the certificate acquisition server, and
generating the first identity authentication certificate by the certificate issuance server according to the first identity authentication certificate; and
receiving the first identity authentication certificate fed back by the certificate issuance server through the certificate acquisition server.

8. The POS terminal according to claim 6, wherein the step of acquiring and storing the injection key according to the injection key ciphertext signature and the second identity authentication certificate comprises:
verifying an identity of the remote injection server according to the second identity authentication certificate;
extracting an authentication public key in the second identity authentication certificate if verification of the identity of the remote injection server is passed;
verifying the injection key ciphertext signature according to the authentication public key in the second identity authentication certificate; and
decrypting an injection key ciphertext in the injection key ciphertext signature to
obtain and store the injection key according to the locally stored private key in the temporary key pair, if verification of the injection key ciphertext signature is passed.

9. The POS terminal according to claim 8, wherein the step of verifying the identity of the remote injection server according to the second identity authentication certificate comprises:
extracting a local issuance public key;
verifying a signature in the second identity authentication certificate according to the issuance public key;
extracting manufacturer information in the second identity authentication certificate if verification of the signature in the second identity authentication certificate is passed;
comparing the extracted manufacturer information with local manufacturer information; and
passing an identity authentication of the remote injection server if the extracted manufacturer information is consistent with the local manufacturer information.

10. The POS terminal according to claim 6, wherein the step of receiving the injection key ciphertext signature and the second identity authentication certificate returned by the remote injection server according to the temporary key signature and the first identity authentication certificate comprises:
receiving the injection key ciphertext signature and the second identity authentication certificate returned by the remote injection server after verification of the first identity authentication information is passed by the remote injection server; wherein the injection key ciphertext signature is generated by the remote injection server by performing a signature on the injection key ciphertext using an authentication secret key corresponding to an authentication public key in the second identity authentication certificate, and wherein the injection key ciphertext is acquired by the remote injection server by encrypting the injection key using the public key in the temporary key signature.

11. One or a plurality of non-transitory readable storage medium storing a computer readable instruction, wherein when the computer readable instruction is executed by one or more processors, the one or more processors is/are configured to be caused to perform following steps of:
detecting an injection key acquisition instruction;
generating a temporary key pair when the injection key acquisition instruction is detected;
acquiring a locally stored private key in a random key pair, and using a private key in the random key pair to perform signature on a public key in the temporary key pair to generate a temporary key signature;
acquiring a first identity authentication certificate;
sending the temporary key signature and the first identity authentication certificate to a remote injection server;
receiving an injection key ciphertext signature and a second identity authentication certificate returned by the remote injection server according to the temporary key signature and the first identity authentication certificate; and
acquiring and storing an injection key according to the injection key ciphertext signature and the second identity authentication certificate.

12. The storage medium according to claim 11, wherein before performing the step of detecting the injection key acquisition instruction, the processor is further configured to be caused by the computer readable instruction to perform following steps of:
sending a certificate request to a certificate acquisition server;
randomly generating the random key pair when a request confirmation information as returned by the certificate acquisition server according to the certificate request is received;
storing the private key in the random key pair locally, and sending a public key in the random key pair to the certificate acquisition server, generating a certificate request file according to the public key in the random key pair and sending the certificate request file to a certificate issuance server by the certificate acquisition server, and
generating the first identity authentication certificate by the certificate issuance server according to the first identity authentication certificate; and receiving the first identity authentication certificate fed back by the certificate issuance server through the certificate acquisition server.

13. The storage medium according to claim 11, wherein the step of acquiring and storing the injection key according to the injection key ciphertext signature and the second identity authentication certificate comprises:

verifying an identity of the remote injection server according to the second identity authentication certificate;

extracting an authentication public key in the second identity authentication certificate, if verification of the identity of the remote injection server is passed;

verifying the injection key ciphertext signature according to the authentication public key in the second identity authentication certificate; and decrypting an injection key ciphertext in the injection key ciphertext signature to obtain and store the injection key according to the locally stored private key in the temporary key pair, if verification of the injection key ciphertext signature is passed.

14. The storage medium according to claim 13, wherein the step of verifying the identity of the remote injection server according to the second identity authentication certificate comprises:

extracting a local issuance public key;

verifying a signature in the second identity authentication certificate according to the issuance public key;

extracting manufacturer information in the second identity authentication certificate if verification of the signature in the second identity authentication certificate is passed;

comparing the extracted manufacturer information with local manufacturer information; and passing an identity authentication of the remote injection server if the extracted manufacturer information is consistent with the local manufacturer information.

15. The storage medium according to claim 11, wherein the step of receiving the injection key ciphertext signature and the second identity authentication certificate returned by the remote injection server according to the temporary key signature and the first identity authentication certificate comprises:

receiving the injection key ciphertext signature and the second identity authentication certificate returned by the remote injection server after verification of the first identity authentication information is passed by the remote injection server; wherein the injection key ciphertext signature is generated by the remote injection server by performing a signature on the injection key ciphertext using an authentication secret key corresponding to an authentication public key in the second identity authentication certificate, and wherein the injection key ciphertext is acquired by the remote injection server by encrypting the injection key using the public key in the temporary key signature.

* * * * *